(12) United States Patent
Che et al.

(10) Patent No.: US 9,476,906 B2
(45) Date of Patent: Oct. 25, 2016

(54) CAPACITIVE ACCELERATION SENSOR WITH AN H-SHAPED BEAM AND PREPARATION METHOD THEREOF

(71) Applicant: SHANGHAI INSTITUTE OF MICROSYSTEM AND INFORMATION TECHNOLOGY, CHINESE ACADEMY OF SCIENCES, Shanghai (CN)

(72) Inventors: Lufeng Che, Shanghai (CN); Xiaofeng Zhou, Shanghai (CN); Bin Xiong, Shanghai (CN); Yuelin Wang, Shanghai (CN)

(73) Assignee: SHANGHAI INSTITUTE OF MICROSYSTEM AND INFORMATION TECHNOLOGY, CHINESE ACADEMY OF SCIENCES, Changning District, Shanghai (CN)

( * ) Notice: Subject to any disclaimer, the term of this patent is extended or adjusted under 35 U.S.C. 154(b) by 220 days.

(21) Appl. No.: 14/387,404

(22) PCT Filed: Dec. 3, 2012

(86) PCT No.: PCT/CN2012/085723
§ 371 (c)(1),
(2) Date: Sep. 23, 2014

(87) PCT Pub. No.: WO2014/063409
PCT Pub. Date: May 1, 2014

(65) Prior Publication Data
US 2015/0075284 A1 Mar. 19, 2015

(30) Foreign Application Priority Data

Oct. 26, 2012 (CN) .......................... 2012 1 0418979

(51) Int. Cl.
*G01P 15/125* (2006.01)
*B32B 38/10* (2006.01)
*B32B 38/00* (2006.01)
*B32B 37/16* (2006.01)
*G01P 1/00* (2006.01)
*G01P 15/08* (2006.01)

(52) U.S. Cl.
CPC ............. *G01P 15/125* (2013.01); *B32B 37/16* (2013.01); *B32B 38/0008* (2013.01); *B32B 38/10* (2013.01); *G01P 1/00* (2013.01); *G01P 15/0802* (2013.01); *B32B 2307/20* (2013.01); *B32B 2307/202* (2013.01); *B32B 2307/206* (2013.01); *B32B 2310/0881* (2013.01); *B32B 2310/14* (2013.01); *B32B 2457/16* (2013.01); *G01P 2015/0822* (2013.01)

(58) Field of Classification Search
CPC .......... B32B 2307/20; B32B 2457/16; B32B 38/0008; B32B 38/10; G01P 15/0802; G01P 15/125; G01P 1/00; G01P 2015/0822
See application file for complete search history.

*Primary Examiner* — Francis Gray
(74) *Attorney, Agent, or Firm* — Global IP Services; Tianhua Gu

(57) ABSTRACT

A capacitive acceleration sensor with an "H"-shaped beam and a preparation method. The sensor at least includes: a first electrode structural layer, a middle structural layer and a second electrode structural layer; the first electrode structural layer and the second electrode structural layer are provided with electrode lead via holes, respectively; the middle structural layer includes: a frame formed at SOI silicon substrate having a double device layer, a seismic mass whose double sides are symmetrical, and an "H"-shaped elastic beam whose double sides are symmetrical, with one end connected to the frame and the other end connected to the seismic mass, there are anti-overloading bumps and damping grooves symmetrically provided on the two sides of the seismic mass, and the "H"-shaped elastic beam and a bulk silicon layer of the oxygen containing silicon substrate satisfy the requirements therebetween:

$\sqrt{2}(a+b+c) < h$, $\sqrt{2}d < h$.

8 Claims, 7 Drawing Sheets

CAPACITIVE ACCELERATION SENSOR WITH AN H-SHAPED BEAM AND PREPARATION METHOD THEREOF

CROSS REFERENCE TO RELATED PATENT APPLICATION

The present application is the US national stage of PCT/CN2012/085723 filed on Dec. 3, 2012, which claims the priorities of the Chinese patent applications No. 201210418979.5 filed on Oct. 26, 2012, which applications are incorporated herein by reference.

BACKGROUND OF THE PRESENT INVENTION

1. Field of Invention

The present invention relates to a field of micro-electromechanical systems (MEMS), in particular to a capacitive acceleration sensor with an "H"-shaped beam and a preparation method thereof.

2. Description of Related Arts

With the progress obtained by the information processing technology and the rapid development of the microprocessor and the computer technology, microprocessors have now been widely used in measurement and control systems. As the capability of these systems strengthens, sensors, as the front end units of information collection systems, play an increasingly important role. Sensors have become crucial parts of automatic systems and robotics. Most broadly, a sensor is a device capable of transforming physical quantity or chemical quantity into an available electrical signal.

An acceleration sensor, just as the name implies, is a sensor element measuring an acceleration value of a moving object, and it is one of the most traditional sensors. According to different detection methods, MEMS acceleration sensors may be divided into capacitive acceleration sensors, piezoresistive acceleration sensors, piezoelectric acceleration sensors, surface acoustic wave acceleration sensors, tunneling acceleration sensors, and the like. A capacitive acceleration sensor comprises a fixed electrode and a movable electrode located on a seismic mass. When the mass block is displaced under the action of an outside acceleration signal, the distance between the movable electrode and the fixed electrode or the area overlapping one another is changed, thereby causing the capacitance value between them to be changed. Via a C/V conversion circuit, it is possible to detect the voltage change which is proportional to the outside acceleration value. The capacitive acceleration sensor has the advantages such as high detection precision, little influence by the temperature changes, and the like.

Capacitive acceleration sensors may be divided into two categories, namely, sandwich capacitive acceleration sensors and comb-finger capacitive acceleration sensors. The sandwich capacitive acceleration sensors may obtain higher detection precision, and the method for manufacturing the sandwich capacitive acceleration sensors is mainly the method of bulk silicon micro-machining. In a sandwich capacitive acceleration sensor, the beam-mass structure whose double sides are entirely symmetrical is the most important sensitive structural part, and its design and manufacturing process is one of the crucial processes of the entire sensor. In the beam-mass structure, if the beam is simply on one surface of the seismic mass and the centroid of the seismic mass and the beam are not on one plane, the transverse acceleration will cause the beam to bend, thereby causing the cross sensitivity of the sensor to rise. Therefore, the manufacturing method of the beam-mass structure whose double sides are entirely symmetrical is very crucial.

In the processing method of the existing sandwich capacitive acceleration sensors, the preparation methods of the sensitive structure of the beam-mass whose double sides are entirely symmetrical include: a concentrated boron-doped self-stop method, a heterogeneous self-stop method and a double layer bonded silicon beam method.

By employing the concentrated boron-doped self-stop method (cf. H Seidel, H Riedel, R Kolbeck, G Mueck, W Kupke, M Koeniger, Capacitive Silicon Accelerometer with Highly Symmetrical Design, Sensors and Actuators A: Physical, Vol. 21, pp. 312-315), when fabricating the entirely symmetrical beam-mass structure, and the process of KOH etching the beam-mass structure as formed finishes, the concentrated boron-doped layer is used as an etching self-stop layer. Thus, the depth of doping decides the thickness of the beam. The disadvantages of such method are that nonuniformity of the doping concentration results in non-uniform thickness of the beam and that the residual stress generated in the boron-doping process will influence the performance of the device, such as sensitivity and linearity, etc.

With respect to fabricating the beam-mass structure whose double sides are parallel and symmetrical, a heterogeneous self-stop method may be used. Take a silicon oxide beam process as an example. The procedure thereof includes manufacturing a pattern of the beam on an oxide layer after oxidizing the silicon wafer, and then releasing the beam-mass structure supported by the silicon oxide beam via silicon etching. As silicon oxide is very crisp and the thickness of silicon oxide obtained by oxidation does not generally exceed 3 μm, the acceleration sensor using a silicon oxide beam has very poor shock resistance.

By employing the double layer bonded silicon beam method, a beam-mass structure whose double sides are parallel and symmetrical is formed (cf. W. S. Henrion, et. al, Sensors structure with L-shaped spring legs, U.S. Pat. No. 5,652,384). The process thereof may employ a method combining KOH etching with Deep Reactive Ion Etching (DRIE). Firstly, KOH is used to etch the silicon wafer from the back to a thickness of the remaining beam, DRIE is then used to release the beam-mass structure from the front, and such beam-mass structure and silicon wafer are further subjected to a bonding process to form a structure whose double sides are entirely symmetrical. Since the entirely symmetrical beam-mass structure can be obtained only by employing a bonding process and a sandwich structure is formed by further performing bonding, the process is very complicated and the cost is comparatively high.

SUMMARY OF THE PRESENT INVENTION

In view of the above-mentioned disadvantages in the prior art, the object of the present invention is to provide a capacitive acceleration sensor with an "H"-shaped beam having highly normal symmetry so as to improve the capability of the device to resist lateral impact and torsional impact and to reduce cross sensitivity.

Another object of the present invention is to provide a method for preparing a capacitive acceleration sensor with an "H"-shaped beam, which method has simple process.

In order to achieve the above-mentioned objects and other relevant objects, the present invention provides a method for preparing a capacitive acceleration sensor with an "H"-shaped beam, at least including:

1) performing etching at two surfaces of an oxygen containing silicon substrate having a double device layer based on an anisotropic etching method, causing the two surfaces to be concave respectively;

2) forming a plurality of anti-overloading bumps at recesses on the two surfaces based on photolithography and the anisotropic etching method, respectively;

3) further forming damping grooves at the two surfaces of the structure on which the anti-overloading bumps have been formed based on photolithography and the anisotropic etching method, respectively;

4) performing etching on the two surfaces of the structure on which the damping grooves have been formed based on photolithography and dry etching, and etching self-stops at a buried oxide layer, respectively, whereby on the two surfaces is formed a structure where the frame and the seismic mass are connected to one of the "H"-shaped elastic beams, respectively, and the anti-overloading bumps and the damping grooves are located on the corresponding seismic mass, and the "H"-shaped elastic beam and the bulk silicon layer of the oxygen containing silicon substrate satisfy the requirements therebetween:

$$\sqrt{2}(a+b+c)<h,$$

$$\sqrt{2}d<h;$$

a and c are width of the "H"-shaped elastic beam, respectively, b is a gap between the two beams, d is a connection width of the joint between the beams and the seismic mass, and h is the thickness of the bulk silicon layer;

5) releasing the "H"-shaped elastic beam and the seismic mass based on photolithography, dry etching and the anisotropic etching method;

6) simultaneously bonding the first electrode structural layer, the structure comprising the released "H"-shaped elastic beams and the seismic mass, and the second electrode structural layer based on a bonding process;

7) forming electrode lead via holes at the first electrode structural layer and the second electrode structural layer of the bonded structure based on infrared aligning; and 8) preparing electrodes on the structure on which via holes have been formed.

Preferably, the dry etching is inductive coupling plasma etching or deep reactive ion etching.

Preferably, the photolithography is performed along <110> crystal orientation.

Preferably, the depth of the recess formed in step 1) does not exceed 3 μm.

Preferably, the height of the anti-overloading bumps does not exceed 1 μm.

Preferably, there are "H"-shaped elastic beams connected at all four sides of the seismic mass.

The present invention further provides a capacitive acceleration sensor with an "H"-shaped beam, at least including:

a first electrode structural layer, a middle structural layer and a second electrode structural layer;

wherein the first electrode structural layer and the second electrode structural layer are provided with electrode lead via holes, respectively;

the middle structural layer includes: a frame formed at an oxygen containing silicon substrate having a double device layer, a seismic mass whose double sides are symmetrical, and an "H"-shaped elastic beam whose double sides are symmetrical, with one beam connected to the frame and the other beam connected to the seismic mass, wherein there are anti-overloading bumps and damping grooves symmetrically provided on the two sides of the seismic mass, and the "H"-shaped elastic beam and a bulk silicon layer of the oxygen containing silicon substrate satisfy the requirements therebetween:

$$\sqrt{2}(a+b+c)<h,$$

$$\sqrt{2}d<h;$$

a and c are width of the "H"-shaped elastic beam, respectively, b is a gap between the two beams, d is a connection width of a joint between the beam and the seismic mass, and h is the thickness of the bulk silicon layer.

As mentioned above, the capacitive acceleration sensor with an "H"-shaped beam and the preparation method of the present invention have the following beneficial effects:

1. Through a design of a parallel and entirely symmetrical "H"-shaped elastic beam on upper and lower sides of a movable seismic mass, an "H"-shaped elastic beam structure which is entirely symmetrical initially is formed via inductive coupling plasma etching or deep reactive ion etching, such that the shape of the elastic beam is more controllable and the compatibility of the fabricating process is stronger.

2. The anti-overloading bumps are fabricated directly on the surface of the seismic mass, instead of fabricating the anti-overloading bumps on the electrode plate, which may simplify the bonding process.

3. The design of the damping grooves on the upper and lower surfaces of the seismic mass may effectively reduce the thermo-mechanical noise of the sensor.

4. The silicon oxide layer of the SOI buried layer is used as a self-stop layer releasing the beam structure, such that the thickness of the entirely symmetrical "H"-shaped elastic beam structure is accurate and controllable.

5. Three layers of silicon wafers are bonded at one time, instead of first bonding the middle structural layer and the first electrode structural layer, and then bonding with the second electrode structural layer, so the process is even simpler.

6 Infrared photolithography alignment is carried out on the middle electrode lead via holes pattern after completing three layer bonding, omitting the complicated process of bonding prealignment.

7. The movable electrodes in the middle of the SOI silicon wafer with the double device layer are led from the upper and lower device layers of the SOI silicon wafer, respectively, and the device layers which are isolated from one another in the SOI silicon wafer are conducted via peripheral connection.

DESCRIPTION OF THE NUMBERS OF THE ELEMENTS

1 First electrode structural layer
2 Middle structural layer

3 Second electrode structural layer
4 Seismic mass
5 Anti-overloading bumps
6 Middle electrode
7 Damping grooves
8 "H"-shaped elastic beam
9 Electrode lead via holes
10 Capacitive gap

DETAILED DESCRIPTION OF THE PREFERRED EMBODIMENTS

The embodiment modes of the present invention are described hereunder through specific examples, and persons skilled in the art may easily understand other advantages and efficacies of the present invention from the contents disclosed in the present description. The present invention may be further implemented or applied through other different specific embodiment modes, and various modifications or amendments may also be made to each of the details in the present description based on different perspectives and applications without departing from the spirit of the present invention.

Please refer to FIG. 1a to FIG. 2d. It is to be noted that the drawings provided in the present embodiment only explain the basic conception of the present invention in an illustrative manner, so the drawings only display the components relevant to the present invention rather than being drawn according to the number, shape and size of the components during actual implementation, the shape, number and scale of each component may be randomly changed during its actual implementation, and the layout of the components thereof might also be more complicated.

Figure 1A:
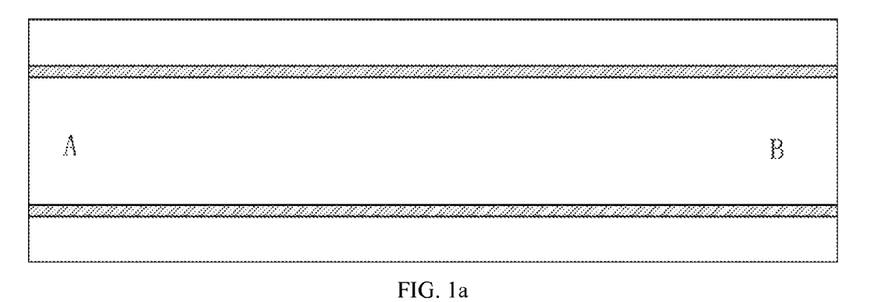
FIGS. 1a-1l are flow charts of a method for preparing a capacitive acceleration sensor with an "H"-shaped beam of the present invention.

The method for preparing a capacitive acceleration sensor with an "H"-shaped beam of the present invention includes the following steps:

1. The fabrication of a middle structural layer, i.e., an entirely symmetrical "H"-shaped beam-mass structure;

(1) Taking the SOI silicon wafer of a double device layer as a substrate, as illustrated in FIG. 1a.

Figure 1B:
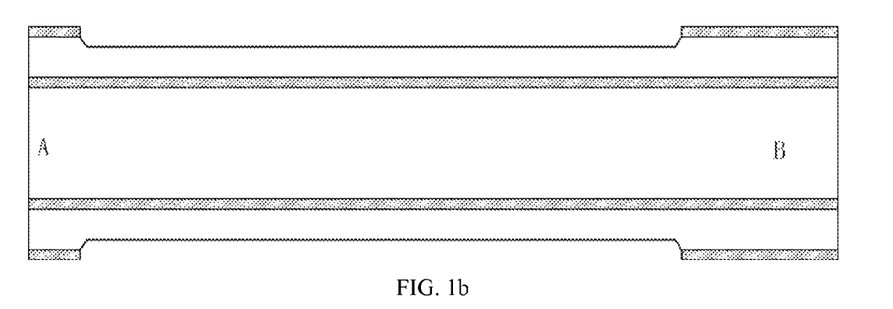

(2) After the silicon substrate is subjected to an oxidation process, creating a KOH etching window through photolithography and etching by a BOE etching solution, and then utilizing a potassium hydroxide (KOH) anisotropic etching method on the upper and lower surfaces of the silicon substrate to cause the two surfaces to be concave, respectively, so as to be capable of having a capacitive gap when bonded with the first electrode structural layer and the second electrode structural layer subsequently, wherein the etching depth is as illustrated in FIG. 1b.

Figure 1C:
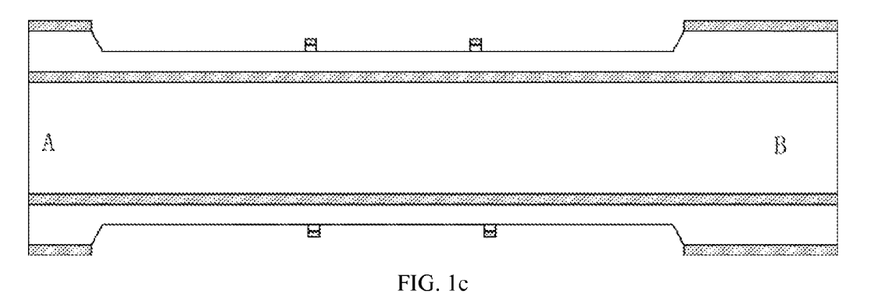

(3) Removing the protection layer of the silicon oxide layer of the remaining area of the silicon substrate which has been concave, and performing oxidation again to form a silicon oxide protection layer, subsequently creating a KOH etching window through photolithography and etching by a BOE etching solution, and fabricating anti-overloading bumps on the upper and lower surfaces of the silicon substrate through an anisotropic etching method, wherein the height of the anti-overloading bumps is 1 μm, as illustrated in FIG. 1c.

Figure 1D:
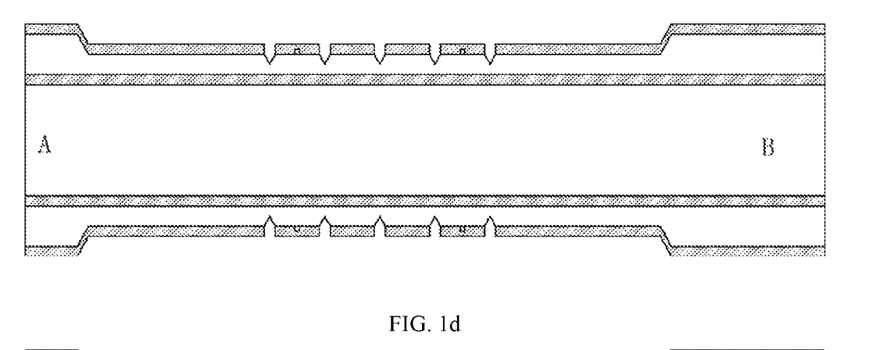

(4) Removing the protection layer of the silicon oxide layer of the remaining area of the structure where the anti-overloading bumps have been formed, performing oxidation again to form silicon oxide, creating a KOH etching window through photolithography and etching by a BOE etching solution, forming damping grooves by etching at the upper and lower surfaces of the silicon substrate using a KOH anisotropic etching method, and forming V-shaped grooves by etch-stop, as illustrated in FIG. 1d.

Figure 1E:
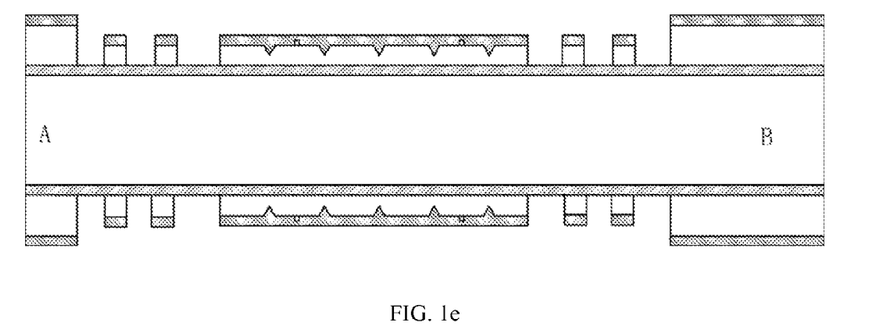

(5) Removing the silicon oxide layer of the remaining area of the structure where the damping grooves have been formed, performing double-sided photolithography, taking photoresist as a masking layer, applying ICP or DRIE dry etching to form a structure where the frame and the seismic mass are connected to the "H"-shaped elastic beam, respectively, and causing the anti-overloading bumps and the damping grooves to be positioned on the corresponding seismic mass, the "H"-shaped elastic beam and the bulk silicon layer of the oxygen containing silicon substrate satisfying the requirements therebetween:

$$\sqrt{2}(a+b+c)<h,$$

$$\sqrt{2}d<h;$$

a and c are width of the "H"-shaped elastic beam, respectively, b is a gap between the two beams, d is a connection width of a joint between the beam and the seismic mass, and h is the thickness of the bulk silicon layer, as illustrated in FIG. 1e, wherein the frame serves as an anchor zone of the seismic mass.

Figure 1F:
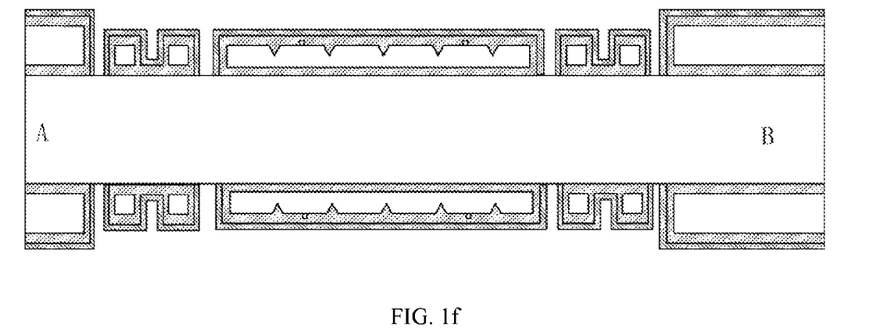

(6) Removing the photoresist protection layer, further oxidizing the silicon substrate, then performing double-sided photolithography, and creating a KOH etching window by etching with a BOE etching solution, as illustrated in FIG. 1f.

Figure 1G:
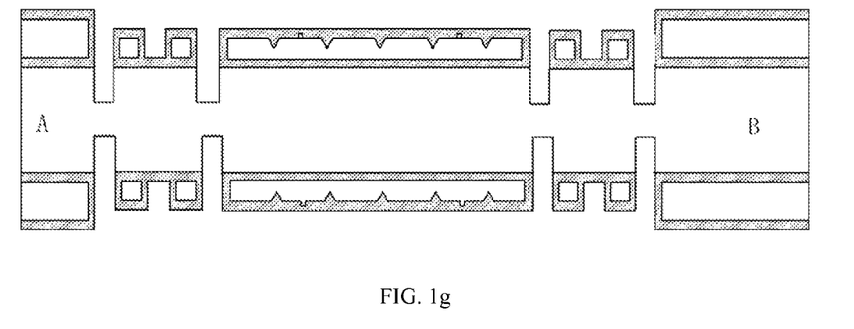

(7) After creating the etching window, continuously using the photoresist in the process of the previous step as a protection layer for ICP or DRIE dry etching, and etching the bulk silicon layer of the SOI silicon substrate, wherein the etching depth should guarantee that the entirely symmetrical "H"-shaped beam and the seismic mass can finally be released through anisotropic etching, as illustrated in FIG. 1g.

Figure 1H:
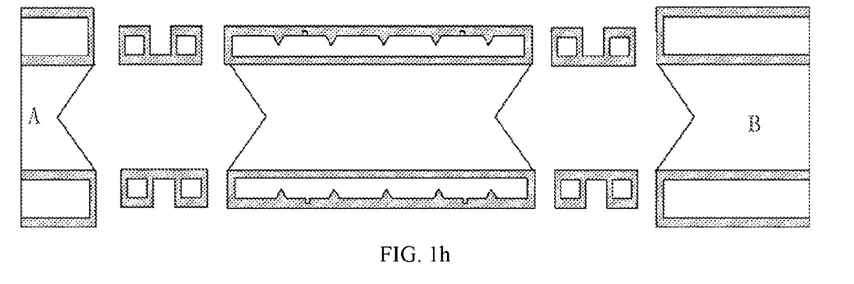

(8) Performing silicon substrate etching using an anisotropic etching method until the "H"-shaped elastic beam and the seismic mass are released. When the entirely symmetrical "H"-shaped beam structure is finished by etching, the buried oxide layer in the double device SOI silicon wafer serves as the etch stop layer, realizing self-stop of the etching process of the beam, as illustrated in FIG. 1h.

Figure 1I:
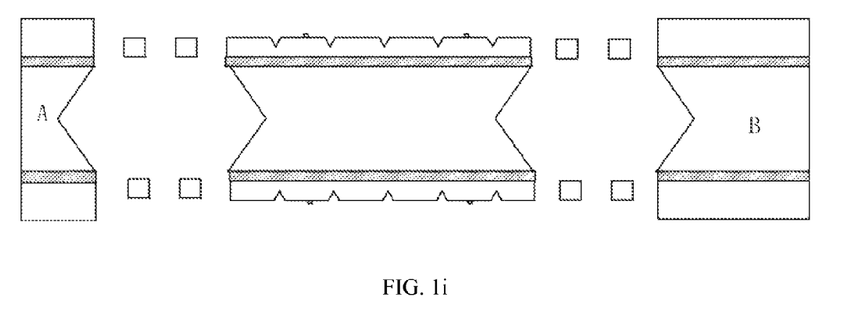

(9) Removing the silicon oxide layer for etching and masking in the remaining area to obtain an entirely symmetrical "H"-shaped beam-mass structure of the middle structural layer, as illustrated in FIG. 1i.

2. The first electrode structural layer and the second electrode structural layer are formed by preparing a silicon oxide insulating layer through thermal oxidization of a direct double-side polished silicon wafer, respectively.

Figure 1J:
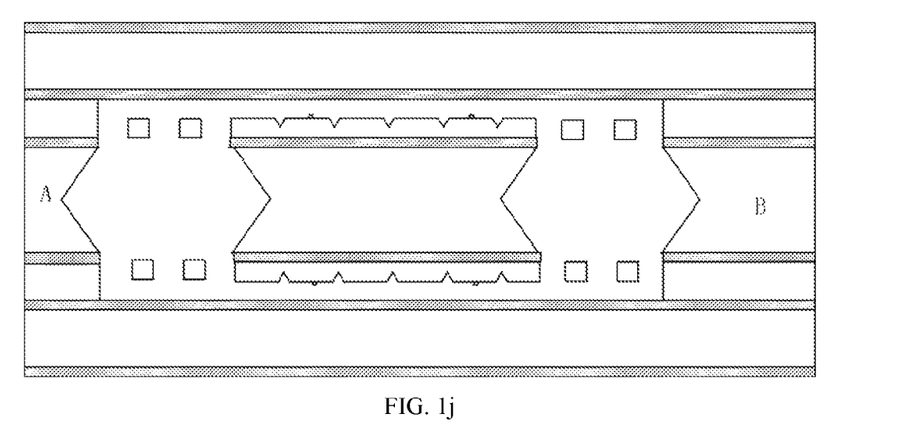
Figure 1K:
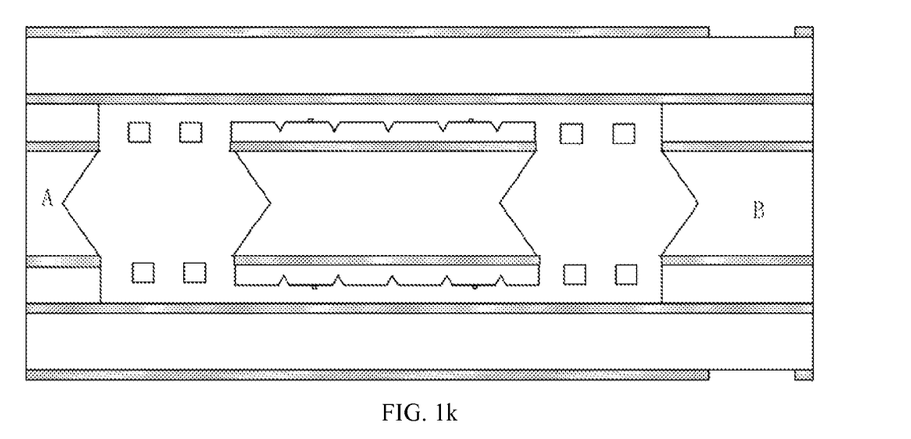

3. Through a simultaneous bonding process of the three layers, the first electrode structural layer, the middle structural layer and the second electrode structural layer are bonded together, as illustrated in FIG. 1j.

4. A middle electrode lead via hole etching window is fabricated at the upper and lower surfaces of the bonded structure through infrared alignment photolithography, as illustrated in FIG. 4k.

Figure 1L:
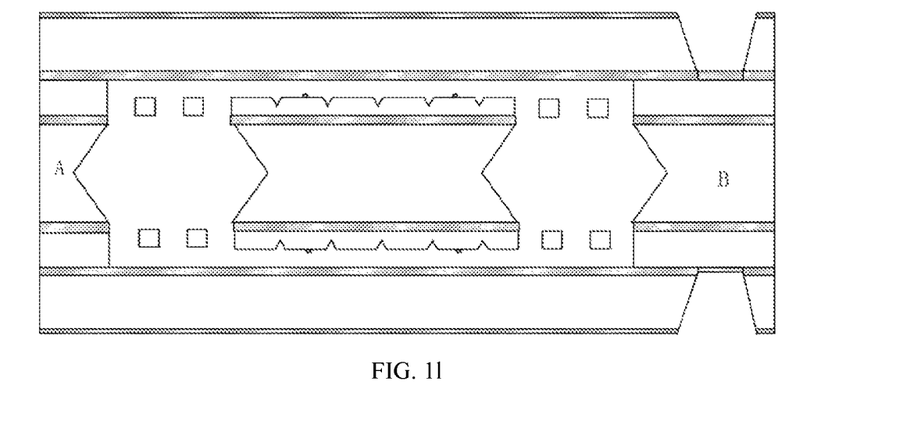

5. Anisotropic etching of silicon is performed to form electrode lead via holes of the middle electrodes of the movable seismic mass, and subsequently the fabrication of the electrode lead of the bonded structure is performed, i.e., a metal layer is fabricated at the front and back sides of the bonded structure by sputtering, evaporation and the like, wherein the materials of the metal layer include, but not limited to, Al, Au, Ni, and the like, as illustrated in FIG. 1l.

Through the foregoing steps, a capacitive acceleration sensor with an "H"-shaped beam as formed is prepared as illustrated in FIGS. 2a to 2d, the capacitive acceleration sensor at least includes: a first electrode structural layer 1, a middle structural layer 2 and a second electrode structural layer 3.

Therein, the first electrode structural layer 1 and the second electrode structural layer 2 are provided with electrode lead via hole 9, respectively, and there are capacitive gaps 10 between the first electrode structural layer 1 and the middle structural layer 2 and between the second electrode structural layer 2 and the middle structural layer 2, the capacitive gaps 10 is formed because the abovementioned silicon substrate is concave.

Figure 2A:
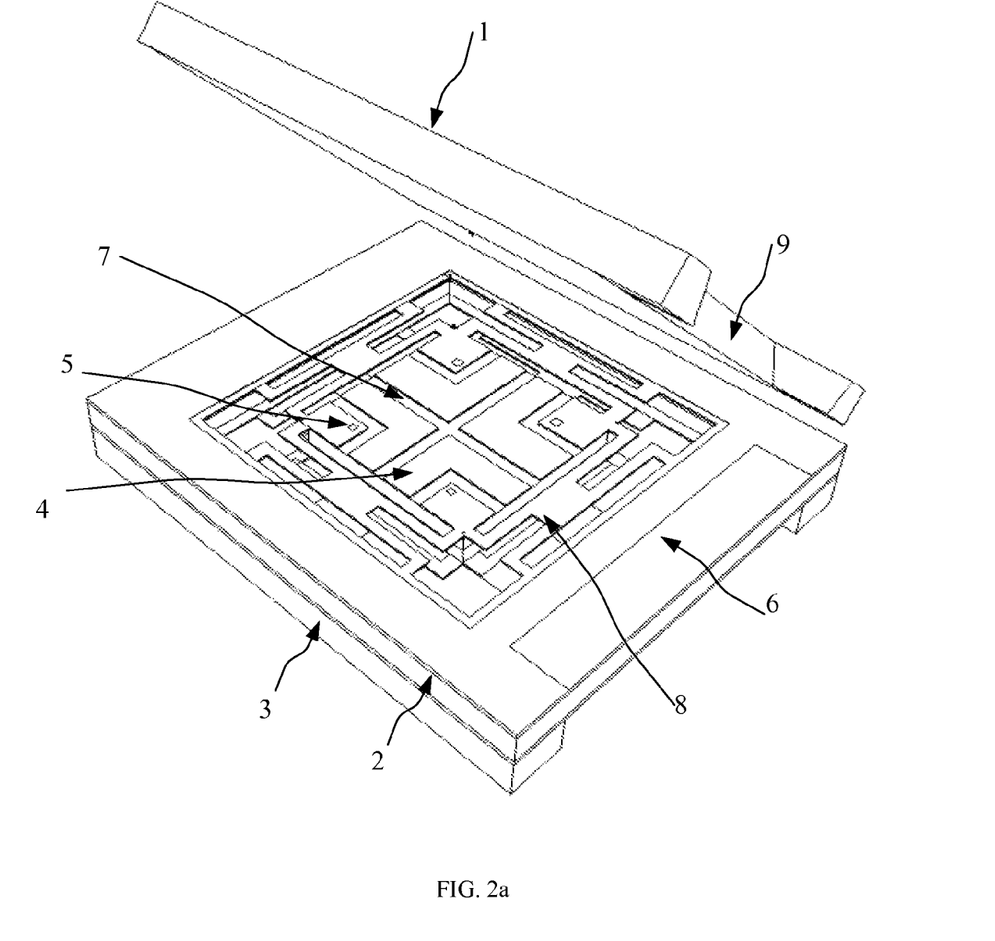
FIG. 2a is a stereogram of a capacitive acceleration sensor with an "H"-shaped beam of the present invention.
Figure 2B:
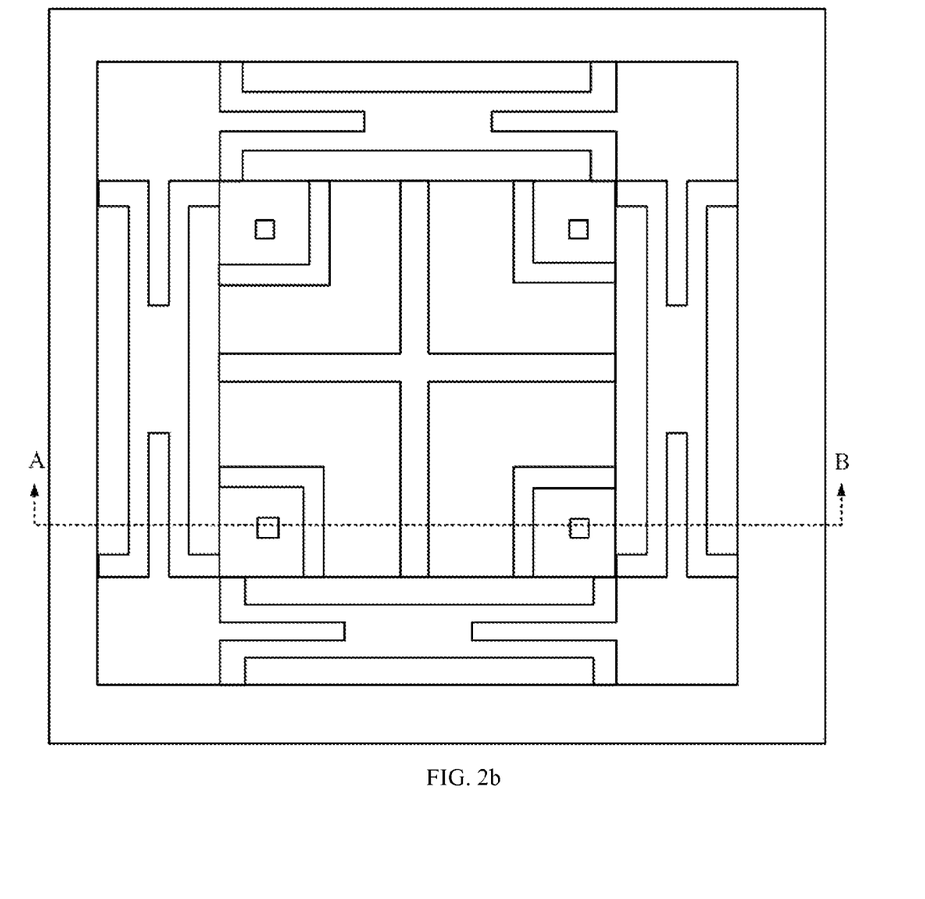
FIG. 2b is a vertical view of a middle structural layer of a capacitive acceleration sensor with an "H"-shaped beam of the present invention.
Figure 2C:
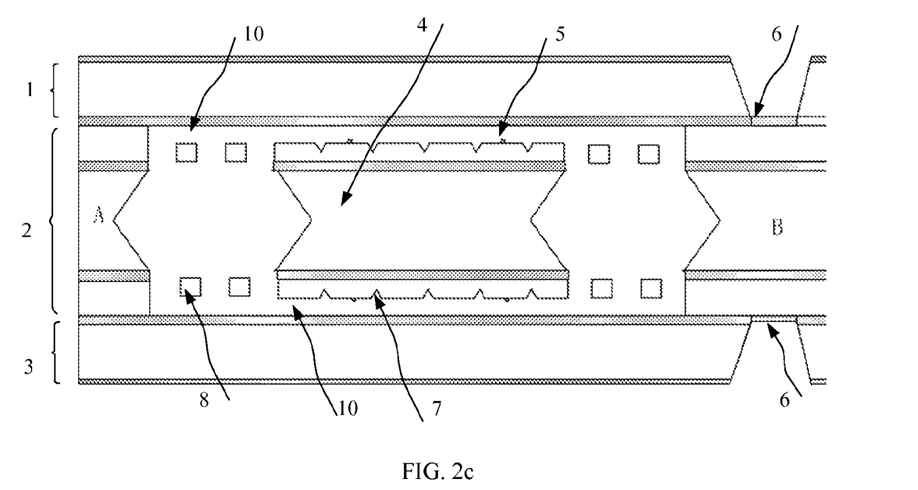
FIG. 2c is an A-B oriented sectional view of a middle structural layer of a capacitive acceleration sensor with an "H"-shaped beam of the present invention.
Figure 2D:
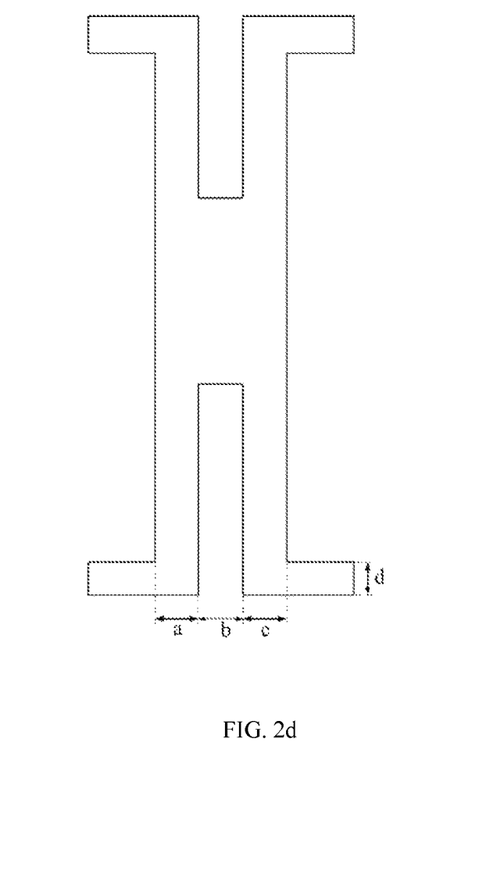
FIG. 2d is a diagram of an "H"-shaped beam of a capacitive acceleration sensor with an "H"-shaped beam of the present invention.

Therein, the middle structural layer 2 includes: a frame formed at an oxygen containing silicon substrate having a double device layer, a seismic mass 4 whose double sides are symmetrical, and an "H"-shaped elastic beam 8 whose double sides are symmetrical, with one end connected to the frame and the other end connected to the seismic mass 4. Therein, there are middle electrodes 6 formed at a part of the frame that correspond to the electrode lead via hole 9, there are anti-overloading bumps 5 and damping grooves 7 symmetrically provided on two sides of the seismic mass, there are "H"-shaped elastic beams 8 connected with all the four sides thereof, and the "H"-shaped elastic beam 8 and a bulk silicon layer of the oxygen containing silicon substrate satisfy the requirements therebetween:

$$\sqrt{2}(a+b+c)<h,$$

$$\sqrt{2}d<h;$$

a and c are width of the "H"-shaped elastic beam, respectively, b is a gap between the two beams, d is a connection width of a joint between the beam and the seismic mass, and h is a thickness of the bulk silicon layer.

Besides, preferably, as the capacitive acceleration sensor with an "H"-shaped beam has a tiny structure (micron dimension) and is etched by anisotropic etching of silicon, the photolithography is performed strictly along <110> crystal orientation, which can effectively guarantee a rectangular seismic mass.

In summary, the method for preparing a capacitive acceleration sensor with an "H"-shaped beam of the present invention, as compared with the existing preparation method, has simple fabricating process, and can simultaneously accomplish the fabrication of the beam and the seismic mass structure; moreover, since the thickness of the beam is decided by the thickness of the device layer in the SOI silicon substrate with the double device layer, the thickness of the beam is accurate and controllable; as the entirely symmetrical "H"-shaped beam and the seismic mass are accurately controllable, the production yield for the beam-mass structure is significantly improved; the capacitive acceleration sensor of the "H"-shaped beam prepared by the preparation method of the present invention may enable the device to have highly normal symmetry, improving the capability of the device to resist lateral impact and torsional impact and reducing cross sensitivity. Therefore, the present invention effectively overcomes all kinds of disadvantages in the prior art and has highly industrial utilization values.

The abovementioned embodiments only illustratively describe the principle and efficacy of the present invention, rather than being used to limit the present invention. Any person skilled in the art may modify or amend the abovementioned embodiments without departing from the spirit and scope of the present invention. Thus, all equivalent modifications or amendments accomplished by persons having common knowledge in the technical field concerned without departing from the spirit and technical thoughts revealed by the present invention shall still be covered by the claims of the present invention.

What is claimed is:

1. A method for preparing a capacitive acceleration sensor with an "H"-shaped beam, wherein said method for preparing the capacitive acceleration sensor of the "H"-shaped beam at least including:
   1) performing etching at two surfaces of an SOI silicon substrate having a double device layer based on an anisotropic etching method, causing the two surfaces to be concave respectively;
   2) forming a plurality of anti-overloading bumps at recesses on the two surfaces based on photolithography and the anisotropic etching method, respectively;
   3) further forming damping grooves at the two surfaces of the structure where the anti-overloading bumps have been formed based on photolithography and the anisotropic etching method, respectively;
   4) performing etching on the two surfaces of the structure where the damping grooves have been formed based on photolithography and dry etching, and etching self-stops at a buried oxide layer, respectively, whereby on the two surfaces is formed a structure where the frame and the seismic mass are connected to the "H"-shaped elastic beam, respectively, and the anti-overloading bumps and the damping grooves are caused to be located on the corresponding seismic mass, the "H"-shaped elastic beam and the bulk silicon layer of the oxygen containing silicon substrate satisfy the requirements therebetween:

$$\sqrt{2}(a+b+c)<h,$$

$$\sqrt{2}d<h;$$

a and c are width of the "H"-shaped elastic beam, respectively, b is a gap between the two beams, d is a connection width of the joint between the beams and the seismic mass, and h is the thickness of the bulk silicon layer;
   5) releasing the "H"-shaped elastic beam and the seismic mass based on photolithography, dry etching and the anisotropic etching method;
   6) simultaneously bonding the first electrode structural layer, the structure comprising the released "H"-shaped elastic beam and the seismic mass and the second electrode structural layer based on a bonding process;
   7) forming electrode lead via holes at the first electrode structural layer and the second electrode structural layer of the bonded structure based on infrared aligning;
   8) preparing electrodes on the structure on which via holes have been formed.

2. The method for preparing a capacitive acceleration sensor with an "H"-shaped beam as in claim 1, wherein the dry etching is inductive coupling plasma etching or deep reactive ion etching.

3. The method for preparing a capacitive acceleration sensor with an "H"-shaped beam as in claim 1, wherein the photolithography is performed along <110> crystal orientation.

4. The method for preparing a capacitive acceleration sensor with an "H"-shaped beam as in claim 1, wherein the depth of the recess formed in step 1) does not exceed 3 μm.

5. The method for preparing a capacitive acceleration sensor with an "H"-shaped beam as in claim 1, wherein the height of the anti-overloading bumps does not exceed 1 μm.

6. The method for preparing a capacitive acceleration sensor with an "H"-shaped beam as in claim 1, wherein there are "H"-shaped elastic beams connected at the four sides of the seismic mass.

7. A capacitive acceleration sensor with an "H"-shaped beam, wherein said capacitive acceleration sensor of the "H"-shaped beam at least including:
- a first electrode structural layer, a middle structural layer and a second electrode structural layer;
- therein the first electrode structural layer and the second electrode structural layer are provided with electrode lead via holes, respectively;
- the middle structural layer includes: a frame formed based on an SOI silicon substrate having a double device layer, a seismic mass whose double sides are symmetrical, and an "H"-shaped elastic beam whose double sides are symmetrical, with one end connected to the frame and the other end connected to the seismic mass, therein there are anti-overloading bumps and damping grooves symmetrically provided on the two sides of the seismic mass, and the "H"-shaped elastic beam and a bulk silicon layer of the oxygen containing silicon substrate satisfy the requirements therebetween:

$$\sqrt{2}(a+b+c) < h,$$

$$\sqrt{2}d < h;$$

a and c are width of the "H"-shaped elastic beam, respectively, b is a gap between the two beams, d is a connection width of a joint between the beam and the mass block, and h is the thickness of the bulk silicon layer.

8. The capacitive acceleration sensor with an "H"-shaped beam as in claim 7, wherein there are "H"-shaped elastic beams connected at all four sides of the seismic mass.

* * * * *